Oct. 29, 1968 H. K. OLOFSSON ET AL 3,407,996
SCREW COMPRESSOR UNITS
Filed June 22, 1966 5 Sheets-Sheet 5

INVENTOR.
Hans Kristofer Olofsson
Hans Gustav Pettersson &
BY Bjørn Ivar Truleson

3,407,996
SCREW COMPRESSOR UNITS
Hans Kristofer Olofsson, Segeltorp, and Hans Gustav Pettersson and Sven Ivar Trulsson, Nacka, Sweden, assignors to Atlas Copco Aktiebolag, Nacka, Sweden, a corporation of Sweden
Filed June 22, 1966, Ser. No. 564,467
14 Claims. (Cl. 230—139)

ABSTRACT OF THE DISCLOSURE

A rotary screw compressor in which a gaseous fluid is compressed in working spaces or chambers formed between intermeshing helically grooved rotors and the enclosing casing. The compressor comprises at least two compressor units each of which are connected as complete components to a transmission mechanism independently of each other.

---

This invention relates to screw compressor units comprising in combination a power transmission casing with a power transmission therein and one or more screw compressors. Screw compressor units of this type may be carried out for single stage compression or for two or multiple stage compression as the case may be and are primarily intended for use in applications where it is desired to have a compact and very rigid unit which may be arranged on a vehicle or other place where space is limited. A further object of the invention is to provide a unit which is so arranged that service is very much facilitated. A further object of the invention is to provide a unit which is cheap in manufacture and which can be built from certain standard components. For the above and other purposes we provide a screw compressor unit comprising in combination, at least two screw compressors each one provided with main and gate rotors having parallel axes disposed in a common plane, a power transmission casing, a power transmission in said casing, coupling means for coupling said power transmission to a motor, flanging means for rigidly securing at least said two screw compressors to the power transmission casing at the opposite end of the transmission to said coupling means, a main shaft mounted for rotation in bearings in the power transmission casing and carrying said coupling means, a toothed driving gear secured on said main shaft, and a driven toothed gear on one rotor of each screw compressor in driving engagement with said driving gear for being driven thereby.

Figure 1:
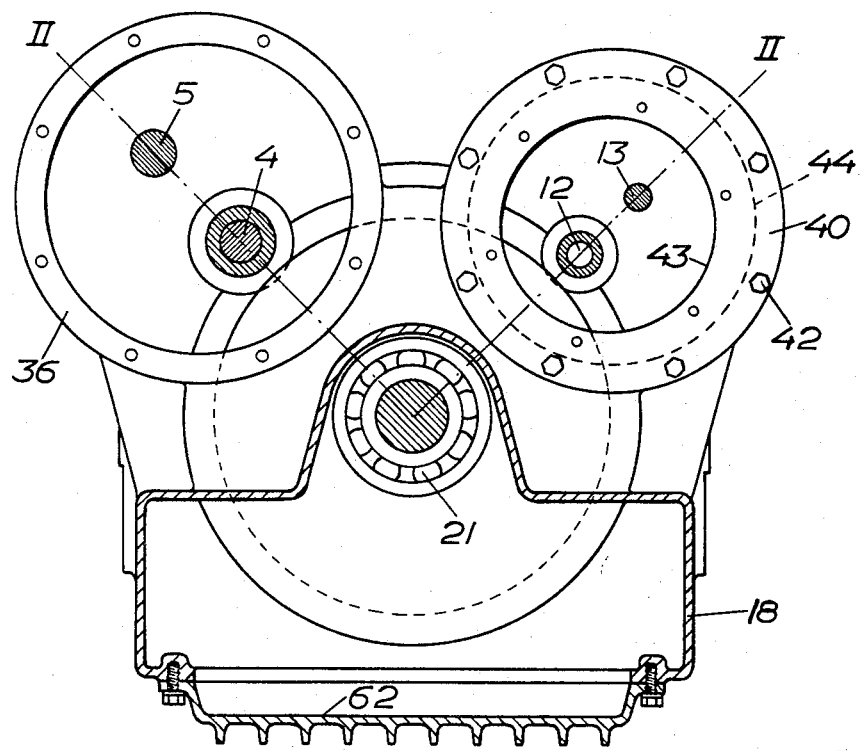
Figure 2:
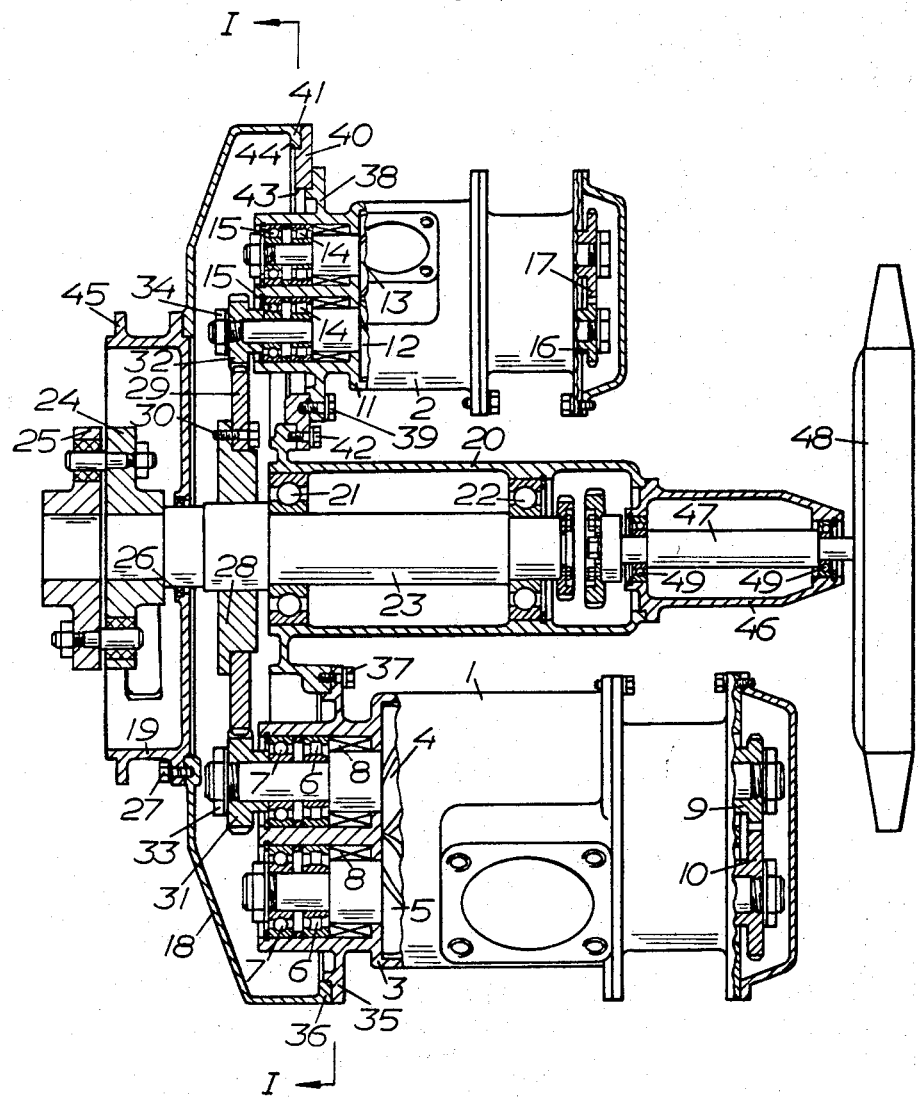
Figure 3:
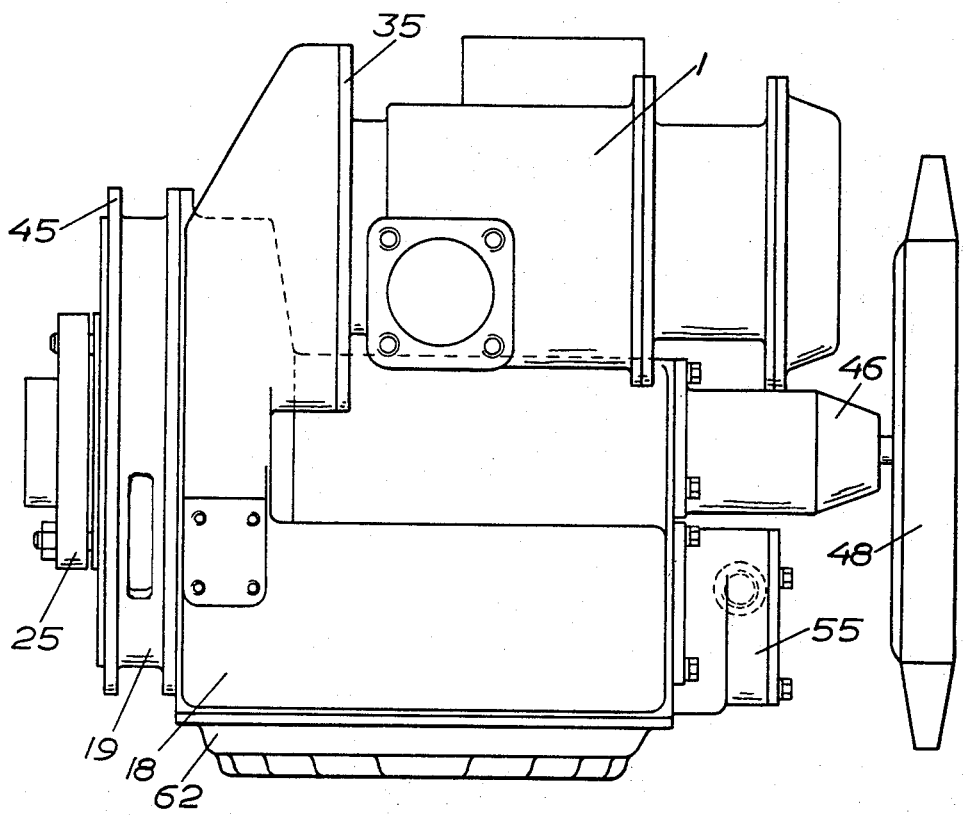
Figure 4:
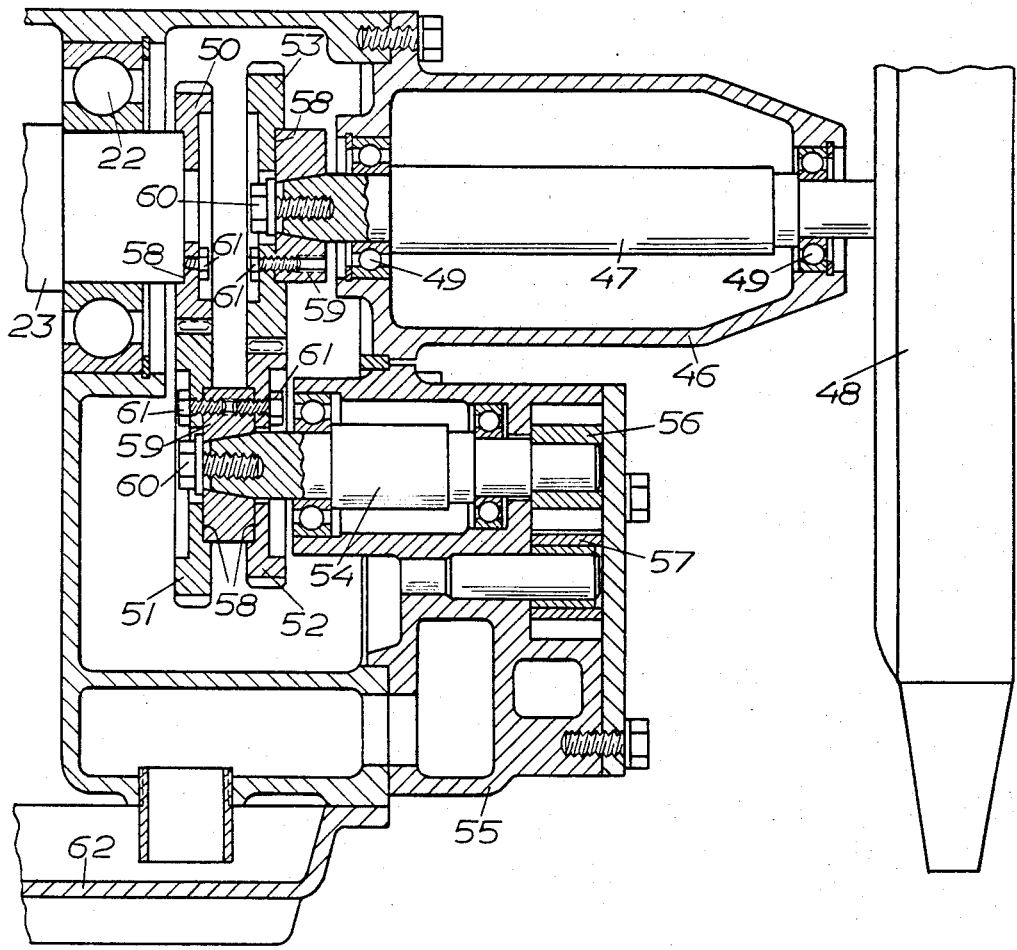
Figure 5:
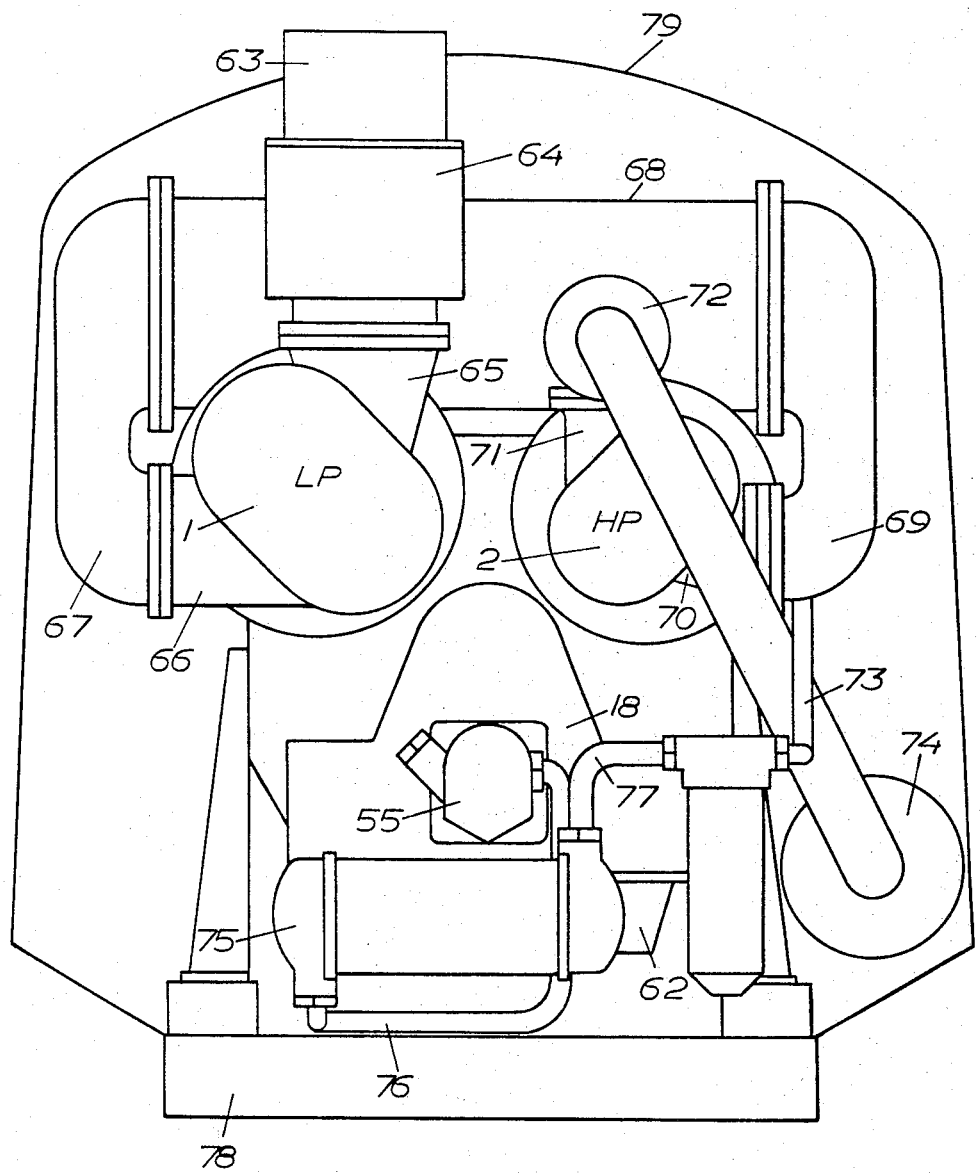

One embodiment of a screw compressor unit according to the invention is illustrated by way of example on the accompanying drawings it being understood, however, that various modifications may be made within the scope of the claims without departing from the scope of the invention. In the accompanying drawings FIG. 1 is a view and partial transverse section of a compressor unit according to the invention looking towards the driving motor end of the unit. FIG. 2 is a section on lines II—II in FIG. 1. FIG. 3 is a side view of the compressor unit according to FIGS. 1 and 2. FIG. 4 is a longitudinal section through the power transmission for driving the fan and an oil pump on a somewhat larger scale, and FIG. 5 is a front end view of the compressor unit in FIGS. 1–4.

The screw compressor unit illustrated in the drawings comprises two screw compressors of the single compression stage type which are arranged to form a two-stage screw compressor unit. However, the invention may with advantage be used also in connection with single stage compressors comprising two or more single stage compressors operated in parallel. The invention may also be employed in connection with multiple stage compressors or single stage compressors in which more than two compressors are connected and driven by a common power transmission.

The screw compressor unit illustrated in the drawings comprises in combination a first low pressure screw compressor 1 and a second high pressure screw compressor 2, which together form a two stage screw compressor. The screw compressor 1 consists of a compressor housing 3, in which a main screw rotor 4 and a gate rotor 5 are mounted for rotation in suitable bearings 6, 7, 8 indicates sealing rings providing a seal against leakage from the compressor housing, and 9 and 10 are the synchronizing gears on the main gate rotors.

The high pressure compressor 2 similarly consists of a compressor housing 11, main and gate rotors 12 and 13, roller and ball bearings 14 and 15 for mounting the main and gate rotors in the compressor housing 11 and synchronizing gears 16 and 17. The two screw compressors 1, 2 are fitted to a power transmission casing which consists of a casing portion 18 and a casing portion 19, the latter of which forms a bell housing. The casing portion 18 forms a main bearing housing 20 which is cast integral with the casing portion 18 and which accommodates two main ball bearings 21 and 22 for a main shaft 23 which is mounted for rotation in said bearings and which carries a coupling member 24 which together with a second coupling member 25 forms a resilient coupling for driving the main shaft from a not illustrated motor the power shaft of which carries the coupling member 25. The coupling member 24 is disposed within the bell housing 19 which housing is provided with a sealing ring 26 for preventing oil leakage from the transmission casing 18. The bell housing 19 is bolted to the casing portion 18 by a number of bolts 27.

The main shaft 23 carries a hub disk 28 to which a toothed driving gear ring 29 is secured. The main rotors 4 and 12 are provided with driven toothed gears 31 and 32 which are fixed to the rotors by means of nuts 33 and 34 and not illustrated keys.

The compressor housing 3 is provided with an external flange 35 which is bolted to a flange 36 on the transmission casing portion 18 by means of bolts 37 so that the gear 31 engages the gear ring 29 in a proper way. The compressor housing 11 is provided with a flange 38 which by means of bolts 39 is bolted to a flange ring 40 which is bolted to a flange 41 on the transmission casing portion 18 by means of bolts 42. The flange ring 40 has an inner bore 43 in which the flange 38 fits and an outer annular guide surface 44 which is eccentric relative to the surface 43 and forms a guide surface for fitting in the flange 41. In the illustrated position the driven gear 32 engages the driving gear ring 29 but if it is desired to drive the compressor 2 with another speed it is possible to replace the driven gear 32 by a similar gear of another size by fitting the flange ring 40 in another position turned relative to the position in FIG. 2 so that the axis of the rotor 12 is disposed more remote from or more near the axis of the main shaft 23 on the line including said axis as well as the axis of the gate rotor 13, i.e., the right part of section line II—II in FIG. 1. By provision of another suitable flange ring 40 having inner dimensions similar to the flange 36 the compressor 2 may be replaced by a compressor exactly like the compressor 1.

The bell housing 19 which is secured to the casing portion 18 has a flange 45 by means of which the bell housing may be bolted directly to an electric drive motor or an internal combustion engine provided for driving the compressor.

On the end of the bearing housing 20 opposite the motor coupling the housing 20 carries a cooling fan bearing housing 46 in which a shaft 47 for a cooling fan 48 is mounted in suitable bearings 49. The fan shaft 47 is coaxial with the main shaft 23 and driven from the main shaft over a power transmission comprising gears 50, 51, 52 and 53, the gears 51 and 52 being fixed to an intermediate shaft 54 mounted in a pump housing 55 for lubricating oil and/or sealing or cooling oil. The oil pump is of conventional design and consists of two cooperating gears 56, 57 mounted for rotation in the pump housing 55. The gears 50, 51, 52 and 53 are all provided with an identical counter bore 58 fitting on the end of the main shaft 23 or on hubs 59 secured to the shaft 47 and 54 and the gears may therefore be interchanged in order to change the transmission speed ratio between the main shaft 23 and the fan shaft 47 and also between the main shaft 23 and the auxiliary pump shaft 54. For instance, by interchanging the gears 52 and 53 the transmission speed ratio between shaft 23 and 47 may be changed to 1:1, if it is assumed that the gears 51, 53 are identical and that similarly the gears 52 and 50 are identical. By interchanging the gears 51 and 50 the speed of the shafts 54 and 47 is increased over the speed obtained with the illustrated arrangement. By providing other sets of gears 50, 53 it is possible to obtain any desired step up or speed reduction as may be desired in order to obtain adequate cooling air flow and oil flow. The hub discs 59 are secured to their respective shafts by bolts 60 and the gears are prevented from rotating on the hubs by bolts 61. 62 indicates the oil sump with which the oil pump 56, 57 communicates.

In the view of FIG. 5 the air inlet conduit is indicated at 63 and a suction throttle valve housing at 64, 65 is the air inlet conduit of the low pressure compressor 1, and 66 the air outlet of compressor 1. The conduits 65, 66 are integral with the housing 3 of compressor 1. 67 is a conduit leading from 66 to an intermediate cooler 68 from which a conduit 69 leads to the high pressure compressor inlet 70. 71 is the high pressure outlet of the compressor 2. The inlet 70 and outlet 71 are integral with the housing 11 of compressor 2, and directed at about 45° to the plane through the rotor axes. 72 is a high pressure check valve or minimum delivery pressure valve and 73 is a conduit leading from 72 to an after cooler 74. 75 is an oil cooler connected to the oil pump by a pipe 76 and to the compressor by a pipe 77. 78 is a portion of a motor compressor frame and 79 indicates a cover supplied in order to further silence the screw compressor unit.

It would be obvious from the above description that the complete screw compressor unit can be removed from the motor arranged for driving said unit by simply loosening the bolts which fix the flange 45 to the motor flange. Furthermore, each compressor 1 or 2 may be removed separately without disturbing the rest of the unit by disconnecting the conduits of the respective compressor and removing the bolts 37 or 39, respectively. The compressor 2 may be replaced by another compressor by removing the bolts 42 together with the compressor 2 and replacing said assembly by another compressor with another flange ring 40 which fits the flange 41 and which has a driven gear which fits the driving gear 29. The inlet and outlet conduits 65, 66, 70, 71 of each compressor housing end with flanges disposed in planes at right angles thereby facilitating the attachment and assembly of connecting conduit 64, 67, 69, 72.

The screw compressor unit according to the invention may be serviced very easily since the vital parts particularly the screw compressors may be removed as a whole without disturbing the rest of the unit. This arrangement also facilitates the provision of suitable spare parts in the way of complete spare compressors 1 or 2, respectively. The compressors may be air cooled or water cooled or provided with oil cooling or with combined cooling systems.

The invention above described and illustrated in the drawings should only be considered as an example and may be modified in different ways within the scope of the following claims.

What we claim is:

1. A screw compressor unit comprising in combination, at least two screw compressors, main and gate rotors with parallel axes in each said screw compressor, a power transmission casing, a power transmission in said casing, coupling means at one end of the transmission casing for coupling said power transmission to a motor, flanging means for rigidly securing at least said two screw compressors separately and independently of each other to the power transmission casing at the opposite end of the transmission casing to said coupling means end, a main shaft mounted for rotation in bearings in the power transmission casing and carrying said coupling means, a toothed driving gear secured on said main shaft, and a driven toothed gear on one rotor of each screw compressor in driving engagement with said driving gear for being driven thereby.

2. A screw compressor unit according to claim 1, in which the transmission casing is provided with flange carrying means for flanging the casing to a driving motor casing to form a unit therewith.

3. A screw compressor unit according to claim 2, in which said flange carrying means consists of a separate bell housing having a wall through which the main shaft extends and which forms a seal on said shaft and which is bolted to the transmission casing, an elastic coupling being provided on the main shaft in said bell housing and arranged for coupling a motor to the main shaft.

4. A screw compressor unit according to claim 1, in which a plane through the axes of two compressor rotors of one screw compressor intersects with a plane through the axes of tw compressor rotors of another screw compressor in the rotary axis of the main shaft.

5. A screw compressor unit according to claim 1, in which the transmission casing consists of a seal carrying casing portion at the motor end and a casing portion forming a bearing housing in which two bearings are fitted at a distance for mounting the main shaft and which has two offset flanges for attachment of two screw compressors extending opposite to said seal carrying casing portion, said casing portions enclosing said power transmission.

6. A screw compressor unit comprising in combination, at least two screw compressors each one provided with single compression stage main and gate rotors having parallel axes, a power transmission casing having a main bearing housing extending axially from one end of said casing, a power transmission in said casing, a main shaft mounted for rotation in bearings in said bearing housing, flanging means for rigidly securing at least said two single stage screw compressors independently of each other to the power transmission casing sideways of said bearing housing and at the same end of the transmission casing as said bearing housing, a toothed driving gear secured on said main shaft, and a driven toothed gear on one rotor of each screw compressor in driving engagement with said driving gear for being driven thereby.

7. A screw compressor unit comprising in combination, first and second screw compressors each one provided with a compressor housing and main and gate rotors having parallel axes and mounted for rotation in bearings in said compressor housing, a power transmission casing, a power transmission in said casing, a main shaft mounted for rotation in bearings in the power transmission, flanging means for rigidly securing said first screw compressor to the power transmission casing, a toothed driving gear secured on said main shaft, a first driven toothed gear on one of the rotors of said first screw compressor in driving engagement with said driving gear for being driven thereby, flanging means for rigidly securing said second screw compressor in at least two different positions relative to the power transmission casing which makes possible the provision of two sizes of toothed driven gears on one of the rotors of said second screw compressor selectively for obtaining two different compressor speeds, and one such gear secured on one rotor of said second compressor in driving engagement with said driving gear.

8. A screw compressor unit according to claim 7, in which said second screw compressor has a circular flange for rigidly securing said second screw compressor to the transmission casing, said circular flange having its centre offset from the centre of the rotor of the screw compressor which is in toothed driving engagement with the toothed driving gear in the transmission casing.

9. A screw compressor unit comprising in combination, at least two screw compressors each one provided with a compressor housing and main and gate rotors having parallel axes and mounted for rotation in bearings in said compressor housing, a power transmission casing having a main bearing housing extending axially from one end of said casing, a power transmission in said casing, a main shaft mounted for rotation in bearings in said bearing housing, flanging means for rigidly securing at least said two screw compressors independently of each other to the power transmission casing sideways of said bearing housing and at the same end of the transmission casing as said bearing housing, a toothed driving gear secured on said main shaft, a driven toothed gear on one rotor of each screw compressor in driving engagement with said driving gear for being driven thereby, a cooling fan bearing housing secured endwise of said main shaft bearing housing, and a cooling fan with a shaft mounted in bearings in said cooling fan bearing housing and arranged to be driven by said main shaft.

10. A screw compressor unit according to claim 9, in which a fan power transmission with interchangeable toothed gears for different fan speeds is provided between the main shaft and the cooling fan shaft.

11. A screw compressor unit according to claim 10, in which an oil pump is provided in driven engagement with said fan power transmission.

12. A screw compressor unit comprising in combination at least two screw compressors each one provided with a compressor housing and single compression stage main and gate rotors having parallel axes and mounted for rotation in said compressor housing, a power transmission casing having a main bearing housing extending axially at one end of said casing, a power transmission in said casing, a main shaft mounted for rotation in bearings in said bearing housing, flanging means for rigidly securing at least said two single stage screw compressors independently of each other to the power transmission casing sideways of said bearing housing and at the same end of the transmission casing as said bearing housing, compressor fluid inlet and outlet integral conduits on each screw compressor housing extending at substantially 45° to the plane through the rotor axes one at each side of said plane at each compressor and having connecting flanges disposed in planes at right angles, a toothed driving gear secured on said main shaft, and a driven toothed gear on one rotor of each screw compressor in driving engagement with said driving gear for being driven thereby.

13. A screw compressor comprising a housing and two single compression stage main and gate rotors having parallel axes and mounted for rotation in said compressor housing, flanging means for rigidly securing said housing to a power transmission casing, compressor fluid inlet and outlet conduits formed integral with said housing and extending at substantially 45° to the plane through the axes of said two rotors one at each side of said plane, and connecting flanges disposed in planes at right angles to said conduits for connecting said conduits to inlet and discharge conduits of said compressor.

14. A screw compressor unit according to claim 1, in which one of the compressors is a low pressure compressor and the other a high pressure compressor, and in which conduit means provide a flow connection between the compressors to form a two compression stage unit.

References Cited

UNITED STATES PATENTS

| | | | |
|---|---|---|---|
| 1,669,050 | 5/1928 | Grant | 230—139 XR |
| 2,185,338 | 1/1940 | Hassler. | |
| 2,358,815 | 9/1944 | Lysholm | 230—143 |
| 2,622,787 | 12/1952 | Nilsson | 230—143 |
| 3,184,155 | 5/1965 | Crooks | 230—139 |
| 3,265,292 | 8/1966 | Schibbye | 230—143 |

FOREIGN PATENTS 958,691    2/1957  Germany.

FRED C. MATTERN, Jr., *Primary Examiner.*

T. R. HAMPSHIRE, *Assistant Examiner.*